Dec. 9, 1958  H. L. HARTMAN  2,863,165
SUPPORT FOR SCALING FISH
Filed June 12, 1957
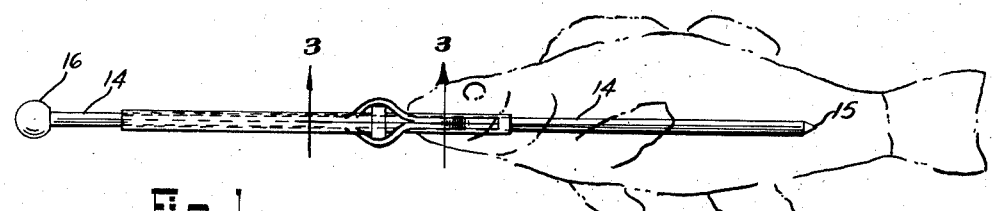
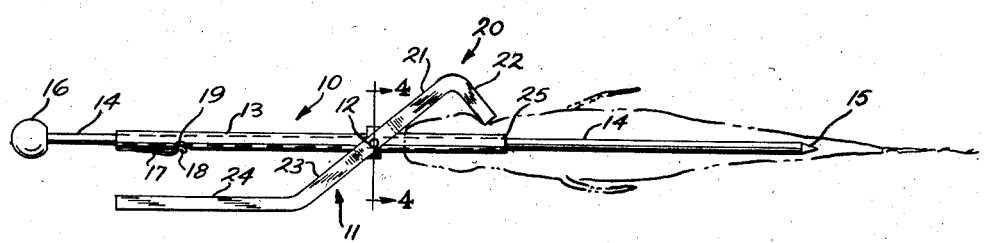
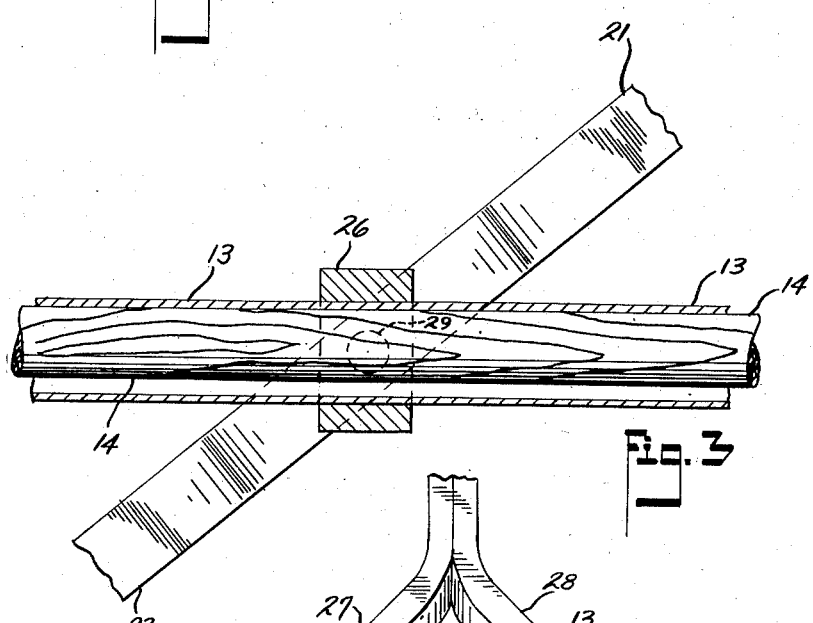
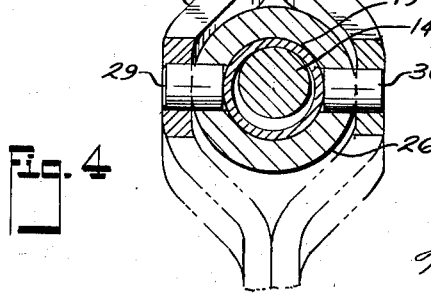
INVENTOR.
HARVEY L. HARTMAN
BY
Hyde, Meyer, Baldwin & Doran
ATTORNEYS

United States Patent Office 2,863,165
Patented Dec. 9, 1958

2,863,165

SUPPORT FOR SCALING FISH

Harvey L. Hartman, Cleveland, Ohio

Application June 12, 1957, Serial No. 665,193

1 Claim. (Cl. 17—8)

This invention relates to supports for scaling fish and more particularly to support means for supporting the fish and imparting stiffness thereto, during a scaling operation.

An object of the present invention is to provide support means for safely holding a fish carcass, which will greatly reduce the possibility of the operator injuring himself with a scaling tool during the scaling operation.

Another object of the present invention is to provide a supporting device for safely scaling fish which includes adjustable means for stiffening the fish carcass so as to prevent the tail of the fish from lifting under pressure and thereby reducing the possibility of the scaling instrument slipping or jumping from its directed course and injuring the operator, during the scaling operation.

Still another object of the present invention is to provide a support means for safely holding a fish carcass during the scaling operation, said support means comprising an adjustable stiffening rod to penetrate the fish carcass and prevent the tail from lifting under pressure, a clamping jaw for tightly engaging the fish and rigidly retaining it against undesirable movement and a hand guard to prevent injury to the operator in case the scaler should accidentally slip or jump off of the fish carcass during the scaling operation.

Another object of the present invention is to provide a support for scaling fish characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of one embodiment of the invention, as illustrated in the accompanying drawings, in which:

Fig. 1 is a top plan view of the fish supporting device as it would appear in engagement with the carcass of a fish.

Fig. 2 is a side elevational view of the fish supporting device shown in engagement with the carcass of a fish.

Fig. 3 is an enlarged transverse fragmentary sectional view, taken along the plane of line 3—3 of Fig. 1 and showing the pivotal connection of the clamping jaw, and Fig. 4 is an enlarged fragmental vertical sectional view taken along the plane of line 4—4 of Fig. 2 and showing the pivotal connection between the two main members comprising the device.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

As shown in Figs. 1 and 2, the support device comprises a plier type tool having a pair of lever members 10 and 11 pivoted together at 12. The lever member 10 consists of a straight tubular member 13 having a bore extending therethrough and adapted to telescopically receive a stiffening rod 14 within said bore. The stiffening rod 14 has a length substantially greater than that of the tubular member 13 so that it may project well beyond the free end of the tubular member 13 for the purpose of penetrating the carcass of a fish. The stiffening rod 14 is preferably provided with a point 15 at one end and an enlarged hand engageable knob 16 at the other end. The knob 16 not only facilitates the ease with which the stiffening rod may be inserted into the fish carcass but also limits the extent to which the left end of the rod, as seen in Figs. 1 and 2, may enter the tubular member 13. Preferably, a leaf spring 17 has one end thereof rigidly secured to the outer surface of the tubular member 13 while the other end thereof is provided with a hook portion 18 which is adapted to be resiliently urged through an opening 19 in the side wall of the tubular member 13 into frictional contact with the stiffening rod 14 so as to maintain the stiffening rod in any selected position with relation to the tubular member 13.

The lever member 11 has an intermediate portion which intersects and crosses the lever member 10 at the pivotal joint 12. The lever member 11 is provided with an integral jaw 20 which is movable about the pivot 12. The jaw 20 consists of a first portion 21 which extends from the pivot 12 laterally outwardly with respect to the tubular member 13 and forwardly or to the right, as seen in Figs. 1 and 2, and a second gripping end portion 22 which extends laterally inwardly and forwardly toward the right end of the tubular member 13, as viewed in Figs. 1 and 2, at substantially right angles to the first portion 21. The section of lever member 11 to the left of the pivot 12 forms a handle comprising a first portion 23 which extends laterally outwardly and rearwardly of the pivot 12 and a second portion 24 which is disposed in spaced parallel relationship to the tubular member 13 when the jaw portion 22 lies closely adjacent end 25 of tubular member 13. Thus, the portions of the lever members 10 and 11 located to the left of the pivot 12, as seen in Figs. 1 and 2, comprise cooperating handle portions which are engageable within the hand of the operator and through which the jaw 20 and end 25 of tubular member 13 located to the right of the pivot 12 are actuated.

The pivotal connection at 12 eliminates the necessity of a pivot pin extending completely through the tubular member 13 and which would interfere with the stiffening rod 14. The tubular member 13 is provided with a closely fitting circular collar 26 which has a side wall thickness substantially greater than the wall thickness of the tubular member 13, as seen in Fig. 4. The lever member 11 is preferably but not necessarily constructed in two layers which are rigidly secured together by welding, riveting or any other suitable means and are separated at the zone of the pivot 12, as seen in Fig. 4, to provide a yoke formed by the two portions 27 and 28. The yoke is adapted to pivotally receive the circular collar 26 and its associated tubular member 13. A pair of spaced pivot pins 29 and 30 extend through the wall thickness of the yoke portions 27 and 28 and into suitable bores provided in the side walls of the circular collar 26. It will be noted that the pivot pins 29 and 30 do not penetrate the side walls of the tubular member 13 but terminate short thereof. The pivotal connection 12 has a two-fold function in that it not only provides a strong, sturdy pivotal connection for the lever members 10 and 11 which does not in any way interfere with the telescopic movement of the stiffening rod 14, but in addition thereto permits the lever members 10 and 11 to remain centered with respect to each other and thereby pivot toward and away from each other in substantially the same plane. Thus, the free end of the jaw portion 22 will move directly toward and away from the tubular member 13 adjacent the end 25.

The operation of the present device should now be apparent to those familiar with this art. With the lever members in an open position, the forward end 25 of the tubular member 13, or that portion viewed to the right of the pivot 12, is first inserted into the mouth of the fish. The free end of the jaw portion 22 is then clamped down on the cheek of the fish by squeezing the handle portions toward each other. Thereafter, the operator, by exerting force upon the ball 16 of the stiffening rod 14, causes the stiffening rod to move telescopically in relation to tubular member 13 to the right so as to penetrate substantially the full length of the fish carcass, as shown in Figs. 1 and 2. In using the device, the operator grasps the handle portions in such a manner that the tubular member 13 rests in the palm of the operator's hand while his fingers engage the handle portion 24 of the lever member 11. When held in this manner, the jaw portions 21 and 22 of the lever member 11 form a raised or upstanding guard which prevents injury to the operator's hand in case a scaler, which is normally held and operated by the other hand of the operator, should accidentally slip or jump off of the fish carcass. If the scaler were to so slip it would merely strike the jaw portion 22 and either be stopped entirely or deflected away from the hand and arm of the operator holding the support device. The jaw 21, 22 is spaced from tubular member 13 preferably at least equal to the thickness of the hand of an operator whose palm is gripping member 13. In other words, the clamping jaw portion 21 when in proper use is so positioned that should the scaler slip or jump from the fish it will be stopped or deflected before it could reach the hand of the operator holding the tool.

The stiffening rod 14 imparts a very rigid condition to the fish and prevents the tail from lifting under pressure exerted thereon by the scaling device. The rigid condition of the fish carcass tends to reduce the possibility of the scaler from lifting or jumping off of the fish. The rigid condition also enables a much easier scaling process.

When one side of the fish has been scaled, the operator simply releases his grip of the tool and opens the jaw while keeping the stiffening rod inserted in the fish. The jaw 20 is then rotated around the head of the fish, about an axis provided by the rod 14 and member 13, until the jaw has reached the opposite cheek of the fish whereupon the operator once again squeezes the handles together and engages the cheek of the fish between the jaw 20 and tubular member 13.

In view of the foregoing description, taken in conjunction with the accompanying drawings, it is believed that a clear understanding of the construction, operation and advantages of the device will be quite apparent to those skilled in this art.

Having thus described my invention and illustrated its use, what I claim as new and desire to secure by Letters Patent is:

A hand manipulated fish carcass supporting tool comprising a straight tubular member having an unobstructed bore, a lever having a gripping end and a handle end and a portion intermediate said ends extending angularly across said tubular member, a pivotal connection between said lever intermediate portion and said tubular member including a yoke on said lever portion embracing said tubular member and aligned pivot pins in said yoke engaging said tubular member on opposite sides of the latter and stopping short of the bore thereof so as to leave the bore unobstructed, the handle end of said lever lying opposite a portion of said tubular member so that the operator's hand may grip them simultaneously, the gripping end of said lever being in position to close against said tubular member and to grip a cheek of a fish there, said lever having a portion adjacent the gripping end thereof extending laterally away from said tubular member to protect a hand grasping said handle end during a scaling operation, a stiffening rod longer than said tubular member and slidable within said member to enter the body of a fish, and interengaging means operatively connected between said tubular member and said rod to hold said rod in various adjusted positions relative to said tubular member.

References Cited in the file of this patent

UNITED STATES PATENTS

| | | |
|---|---|---|
| 2,506,227 | Lindsey | May 2, 1950 |
| 2,587,007 | Southward et al. | Feb. 26, 1952 |
| 2,603,829 | Siskoff | July 22, 1952 |

FOREIGN PATENTS

| | | |
|---|---|---|
| 45,794 | Sweden | Sept. 20, 1919 |